Nov. 23, 1965 W. BROWN 3,219,325
MIXING VALVE

Filed Dec. 4, 1962 2 Sheets-Sheet 1

INVENTOR:
WILLIAM BROWN
BY
Frederick Breitenfeld
ATTORNEY

Nov. 23, 1965  W. BROWN  3,219,325
MIXING VALVE
Filed Dec. 4, 1962  2 Sheets-Sheet 2
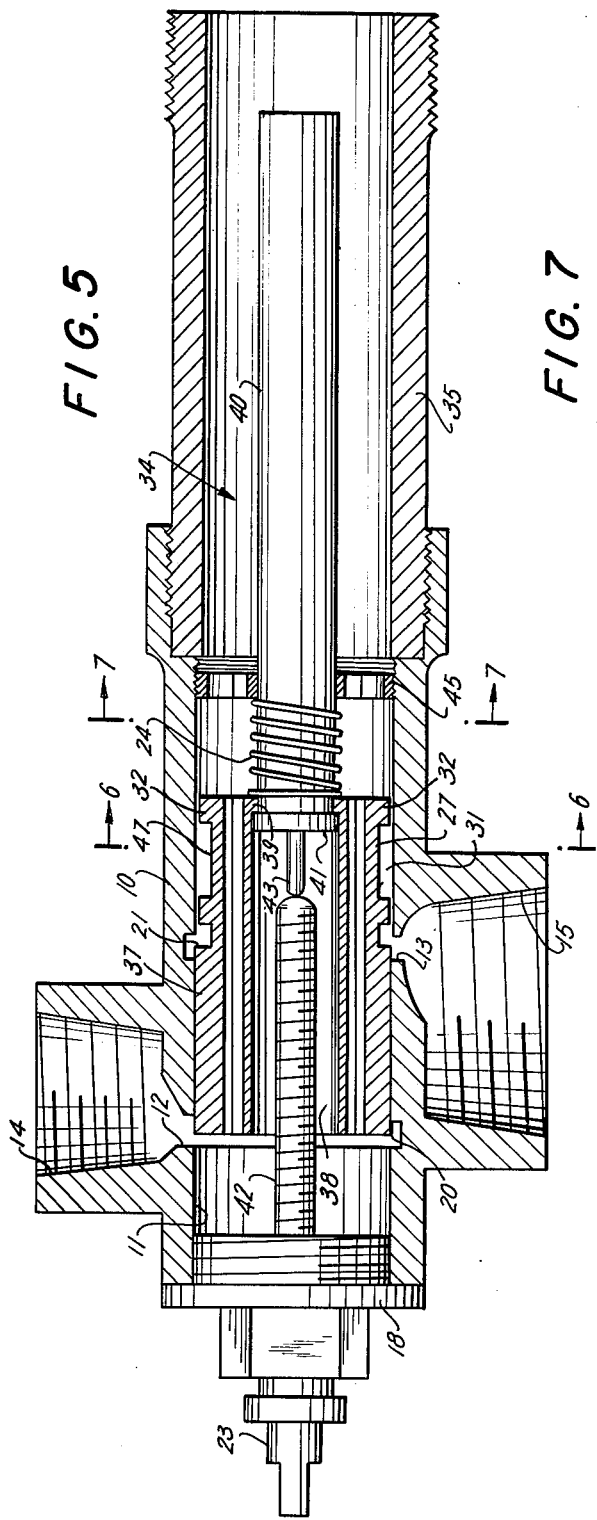
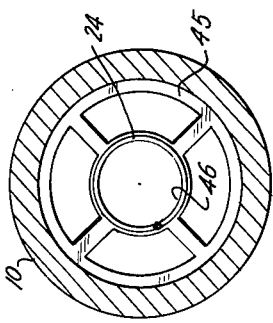
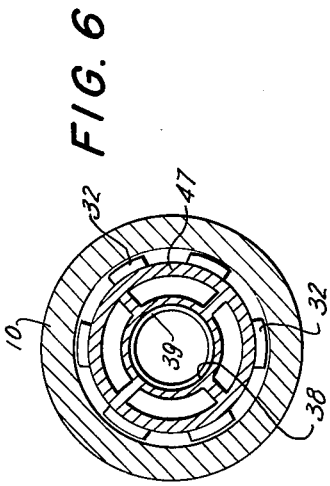
INVENTOR.
WILLIAM BROWN
BY Frederick Breitenfeld
ATTORNEY 3,219,325
MIXING VALVE
William Brown, 207 E. 60th St., New York, N.Y.
Filed Dec. 4, 1962, Ser. No. 242,325
5 Claims. (Cl. 261—159)

This invention relates to mixing valves, and more particularly to valves for intermixing water and steam to produce hot water.

As is well known, when water and steam are brought into direct contact, a severe shock results commonly referred to as "water hammer." This effect is not only disturbingly noisy, it also places inordinate stresses on the installation which often lead to serious damage requiring expensive repair.

It is an object of the present invention to alleviate this problem by providing a valve capable of mixing steam and water to produce hot water without the accompaniment of "water hammer."

It is another object of the invention to provide such a valve which is simple in construction and inexpensive to manufacture.

It is a further object of the invention to provide such a valve which is entirely self-contained and requires no external equipment to enable it to successfully and safely mix water and steam.

Other objects and advantages of the invention will be apparent from the following description in which reference is made to the accompanying drawings.

In the drawings:

FIG. 5 is a view similar to FIG. 1 showing another embodiment of the invention;

FIG. 6 is a vertical cross-sectional view taken on line 6—6 of FIG. 5; and

FIG. 7 is a vertical cross-sectional view taken on line 7—7 of FIG. 5.

Figure 1:
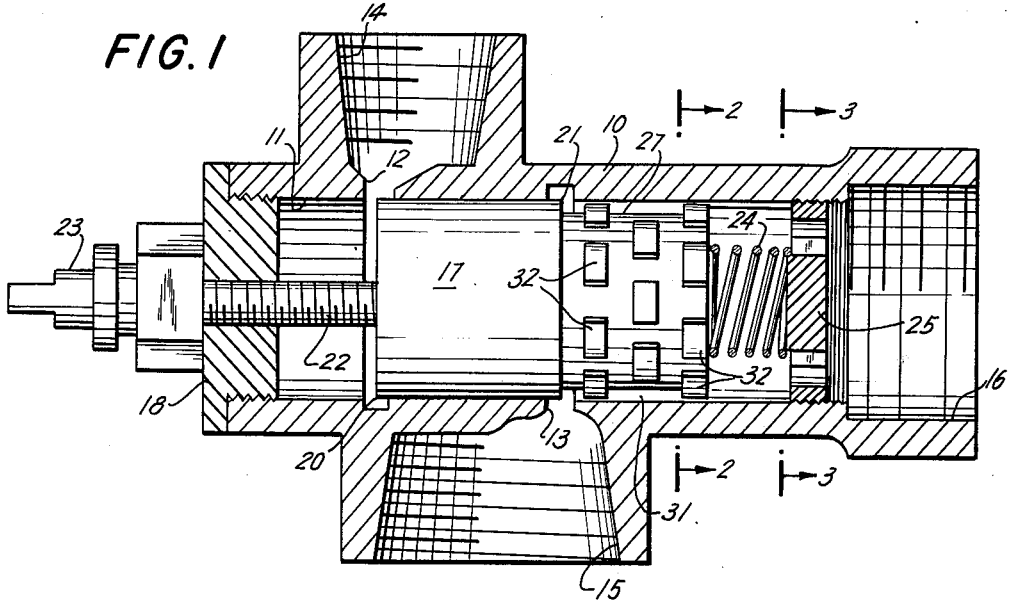
FIG. 1 is a vertical longitudinal cross-sectional view through an illustrative valve embodying the present invention.
Figure 2:
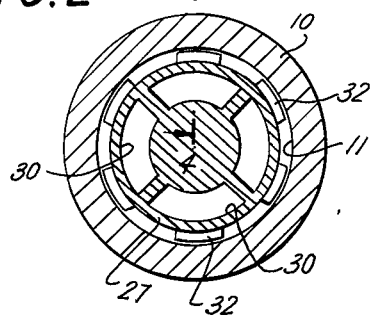
FIG. 2 is a vertical cross-sectional view taken on line 2—2 of FIG. 1.

FIGS. 1–4 show an illustrative valve having a hollow cylindrical body 10 defining a cylindrical valve chamber 11. The body is provided with two longitudinally spaced inlet ports 12 and 13 in the form of channels extending circumferentially around the valve chamber. The port 12, which is located upstream with respect to the port 13, communicates with a connection element 14, which may be threaded, and the port 13 communicates with an oppositely facing connection element 15. It is intended that the element 14 be connected to a source of water, and that the element 15 be connected to a source of steam, so that the water enters the valve chamber at a point upstream of the steam entry point. The body 10 is also provided with a hot water outlet port 16 at its downstream end, and is closed by a cap 18 at its upstream end.

Slidable longitudinally within the valve chamber 11 is a cylindrical sleeve valve element 17 having an upstream cut-off edge 20, in the region of the port 12, and a downstream cut-off edge 21 in the region of the port 13. It will be seen that if the valve element 17 is moved in an upstream direction, the flow area of the water inlet port 12 will decrease and the flow area of the steam inlet port 13 will increase, and as a result, the temperature of the water leaving through outlet port 16 will increase. Conversely, if the valve element 17 is moved in a downstream direction, the proportion of water to steam entering the valve chamber will increase and as a result, the outlet water temperature will decrease.

Figure 3:
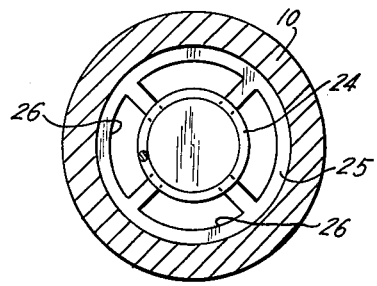
FIG. 3 is a vertical cross-sectional view taken on line 3—3 of FIG. 1.
Figure 4:
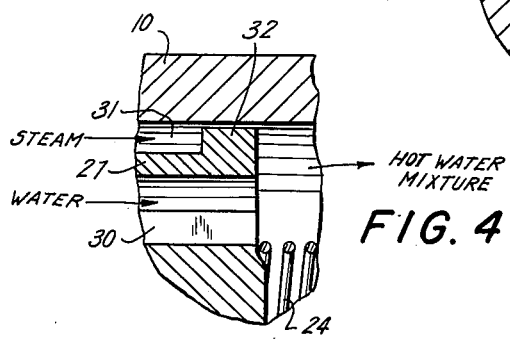
FIG. 4 is an enlarged fragmentary view of a portion of FIG. 1.

In cases where the temperatures and pressure of the water and steam supplied to the valve remain constant, a manually adjustable mechanism may be employed to position the valve element 17 in order to produce outlet water at a desired temperature. This mechanism includes, for example, a stud 22 threaded through the cap 18 and provided with an external stem 23 by means of which the stud may be rotated. The inner end of the stud abuts the upstream face of the valve element 17. Consequently, rotating the stud 22 in the proper direction will cause it to advance into the valve chamber and move the valve member 17 downstream against the force of a compression spring 24 arranged coaxially within the valve chamber. The downstream end of the spring 24 bears against a spider 25 which may be formed as an integral part of the valve body or which may be threaded into the valve chamber near the outlet port 16. As best shown in FIG. 3, the spider is provided with openings 26 constituting flow passageways through which the interior of the valve chamber communicates with the outlet port 16. The force of the spring 24 is transmitted to the valve element 17 through a heat exchange element 27 which in the present example, as will be described below, is attached to and movable with the valve element. If the heat exchange element 27 is not made to move with the valve element, the spring would be arranged to act directly on the valve element. Thus, when it is desired to move the valve element in an upstream direction, the stud 22 is rotated so as to cause it to withdraw from the valve chamber thereby permitting the spring 24 to push the valve element in the desired direction.

The heat exchange element 27, which is fabricated from heat conductive material, is located within the valve chamber on the downstream side of the steam inlet port 13. In the present illustrative embodiment, the valve element 17 and heat exchange element 27 are an integral unit having internal passageways 30 (FIG. 2) extending longitudinally for the full length of the unit. However, the heat exchange element 27 need not be integral with or even attached to the valve element 17. Furthermore, the heat exchange element 27 need not be movable but could be stationary with respect to the valve body 10. What is required is that there be fluid communication between the passageways 30 within the valve element and the corresponding passageways within the heat exchange element. Consequently, when water flows into the valve chamber through the inlet port 12, it will flow through the passageways 30 to a point on the downstream end of the heat exchange element 27. The passageways 30 are defined by a central portion within the valve and heat exchange elements, forming bearing surfaces for the stud 22 and spring 24, and a series of webs supporting the central portion.

The external diameter of the heat exchange element 27 is generally smaller than the diameter of the interior wall of the valve chamber 11 so as to produce an annular space 31, between the element 27 and the chamber wall, through which steam entering the valve chamber through the inlet port 13 flows to a point on the downstream end of the heat exchange element. As the steam flows through the passageway 31, it gives up heat which is transferred through the heat exchange element 27 to the water flowing through the passageways 30 (see FIG. 4). The temperature of the water is thus raised, and the temperature of the steam is decreased to the point where it condenses. By the time the steam reaches the downstream end of the heat exchange element 27, it is completely condensed and is therefore able to mix with the water exiting from the passageways 30, to produce water at the desired outlet temperature, without any danger whatsoever of "water hammer." The mixture then flows through the openings 26 in the spider 25 and out the outlet port 16.

In order to insure that the steam will be completely condensed by the time it completes its travel through the passageway 31, the exterior surface of the heat exchange element is formed with a plurality of radially projecting portions 32 extending to the interior wall of the valve chamber. These projections serve to increase the surface area of the heat exchange element with which the steam comes into contact. Furthermore, some of the portions 32 are out of longitudinal alignment with others for the purpose of interrupting longitudinal flow paths through the passageway 31 whereby the steam is constrained to follow a sinuous path during its flow from inlet port 13 to the downstream end of the element 27. As a result, the velocity of the steam is slower than it would be if it flowed longitudinally through the passageway 31, and the steam is forced to contact a greater area of the heat exchange element than it otherwise would.

The present valve is capable of intermixing water at any temperature and pressure with steam at any temperature and pressure to produce hot water. For example, if inlet water is supplied at 60° F. and 40 pounds per square inch, and inlet steam is supplied at 235° F. and 25 pounds per square inch, the temperature of the outlet water at one particular setting of the valve element 17 will be 190°. F.

If the valve is to be used in a situation where the inlet water and steam temperatures are likely to vary, and a constant outlet water temperature is nevertheless desired, it is advantageous to replace the manual adjustment means of FIG. 1 by means responsive to the outlet water temperature for adjusting the position of the valve element. Such a means, shown in FIG. 5, comprises principally a thermostat 34 which itself is well known and therefore need not be described in detail. A protective enclosure is provided for the thermostat in the form of a length of pipe 35 threaded into the outlet port 16. The valve of FIG. 5 is identical to that of FIG. 1 except that the central portion of the unit comprising the valve element 37 and heat exchange element 47 is provided with a central longitudinal bore 38 (see FIGS. 5 and 6) and the central portion of the spider 45 is provided with a central hole 46 (see FIGS. 5 and 7). For the sake of simplicity, the thermostat is not shown in FIGS. 6 and 7. The downstream end of the bore 38 is reduced in diameter to provide the heat exchange element with an inwardly projecting annular ledge 39. In addition, the stud 42 is longer than the stud 22 of FIG. 1.

The thermostat 34 has a cylindrical housing 40 closed at its downstream end and provided with a cap 41 at its upstream end. The cap 41 is formed with a hole through which a rod 43 slidably projects from inside the housing. The thermostat is so constructed that when its temperature rises, the rod 43 tends to move further out of the housing 40, and when its temperature drops, the rod moves into the housing. The housing 40 passes through the hole 46 in the spider 45 and is slidably supported by the spider. The upstream end of the thermostat fits within the bore 38 in the integral valve and heat exchange element and the margin of the cap 41 engages the ledge 39 so that any movement of the housing 40 in a downstream direction will cause the valve element 37 and heat exchange element 47 to move in the same direction against the force of the spring 24. The stud 42 is aligned with the rod 43 so that the ends of the stud and rod are in contact.

The mixture of water and condensed steam leaving the valve flows through the pipe 35 and comes into contact with the thermostat 34. If the mixture is hotter than the desired predetermined outlet water temperature, the rod 43 will tend to move out of the thermostat housing 40 but will be prevented from doing so by the stud 42. Consequently, the housing 40 will move in a downstream direction pulling the valve element 37 with it. As a result, the cut-off edge 21 of the valve element reduces the flow area of the steam inlet port 13, and the cut-off edge 20 enlarges the flow area of the water inlet port 12. Thus the ratio of water to steam entering the valve increases and the temperature of the outlet water decreases to the desired value. Conversely, if the outlet water temperature drops below the predetermined value, the rod 43 will retract into the housing thereby permitting the spring 24 to move the valve element 37 in an upstream direction to increase the ratio of incoming steam to incoming water.

The temperature of the outlet water is determined by the position of the end of the rod 43 which engages the stud 42. Hence the outlet temperature may be varied by rotating the stem 23 in order to alter the position of the end of the stud.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A valve for intermixing water and steam to produce hot water comprising a cylindrical valve chamber having longitudinally spaced inlet ports for the water and steam respectively, said water inlet port being upstream with respect to said steam inlet port, a hollow sleeve valve element within said chamber between said inlet ports and movable longitudinally thereof, means operatively associated with said valve element for moving it longitudinally, said valve element having spaced cut-off edges facing in opposite directions for controlling the flow through said inlet ports, and a hollow heat exchange element having an imperforate cylindrical wall within said valve chamber on the downstream side of said steam inlet port, the interior of said exchange element communicating with the interior of said valve element and being free of means for obstructing the longitudinal flow through it so that water entering said valve chamber flows through said valve element and exchange element to a mixing point at the downstream end of the latter, the exterior of said heat exchange element being shaped to define a space between it and the interior wall of said valve chamber to provide a flow passageway from said steam inlet port to said mixing point, and a plurality of groups of radially aligned raised portions on the exterior of said heat exchange element, said portions being discontinuous and serving to increase the exterior surface area of said exchange element, the raised portions of adjacent groups being out of longitudinal alignment with each other in order to interrupt all the longitudinal flow paths through said flow passageway, whereby when steam enters said passageway and contacts said heat exchange element it gives up heat to the water flowing through said exchange element and condenses before reaching said mixing point.

2. A valve according to claim 1 wherein said heat exchange element is attached to and movable with said valve element.

3. A valve according to claim 1 including resilient means urging said valve element toward a position wherein it closes said water inlet port, and wherein said moving means include adjusting means opposing said resilient means and adapted to urge said valve element toward a position wherein it closes said steam inlet port for controllnig the relative volumes of water and steam entering said valve chamber.

4. A valve according to claim 3 wherein said adjusting means is a threaded stud bearing against said valve element and adapted when rotated to move longitudinally with respect to said valve chamber.

5. A valve according to claim 3 wherein said adjusting means is a thermostat adapted to move said valve element in a downstream direction when the temperature at said mixing point rises above a predetermined value.

References Cited by the Examiner
UNITED STATES PATENTS

| | | | |
|---|---|---|---|
| 1,947,606 | 2/1934 | Lonergan | 138—38 X |
| 2,076,038 | 4/1937 | McKone | 165—177 |
| 2,276,073 | 3/1942 | Tidd | 261—159 |
| 2,480,706 | 8/1949 | Brinen | 138—38 |
| 2,539,280 | 1/1951 | Smith | 261—39 |
| 2,797,073 | 6/1957 | Haltmeier | 261—39 |
| 2,810,523 | 10/1957 | Branson | 236—12 |
| 2,828,075 | 3/1958 | Panza et al. | 137—625.4 |
| 2,905,387 | 9/1959 | Powell | 137—625.4 |
| 2,910,242 | 10/1959 | Freismuth et al. | 137—625.4 |
| 2,967,666 | 1/1961 | Carlson | 236—12 |
| 3,022,798 | 2/1962 | Taylor | 137—625.4 |

HARRY B. THORNTON, *Primary Examiner.*

HERBERT L. MARTIN, *Examiner.*